US009462591B2

(12) United States Patent
Zakrzewski

(10) Patent No.: US 9,462,591 B2
(45) Date of Patent: *Oct. 4, 2016

(54) MOBILE COMMUNICATIONS NETWORK, INFRASTRUCTURE EQUIPMENT, MOBILE COMMUNICATIONS DEVICE AND METHOD

(75) Inventor: Robert Zakrzewski, Bristol (GB)

(73) Assignee: SCA IPLA Holdings Inc., New York, NY (US)

( * ) Notice: Subject to any disclaimer, the term of this patent is extended or adjusted under 35 U.S.C. 154(b) by 77 days.

This patent is subject to a terminal disclaimer.

(21) Appl. No.: 13/884,141

(22) PCT Filed: Oct. 28, 2011

(86) PCT No.: PCT/GB2011/052104
§ 371 (c)(1),
(2), (4) Date: Jul. 26, 2013

(87) PCT Pub. No.: WO2012/063042
PCT Pub. Date: May 18, 2012

(65) Prior Publication Data
US 2013/0301559 A1 Nov. 14, 2013

(30) Foreign Application Priority Data
Nov. 8, 2010 (GB) .................................. 1018846.4

(51) Int. Cl.
*H04W 72/04* (2009.01)
*H04W 28/02* (2009.01)
(Continued)

(52) U.S. Cl.
CPC ..... *H04W 72/0486* (2013.01); *H04W 28/0215* (2013.01); *H04W 28/0252* (2013.01); *H04W 28/0289* (2013.01); *H04W 28/12* (2013.01); *H04W 88/08* (2013.01)

(58) Field of Classification Search
CPC .......... H04L 12/2818; H04W 76/021; H04W 4/005; H04W 4/0055; F41A 17/08; H04M 1/00
USPC .............. 455/422.1, 411, 466; 370/235, 230, 370/328, 329, 338, 341, 349
See application file for complete search history.

(56) References Cited

U.S. PATENT DOCUMENTS

RE31,182 E * 3/1983 Crager et al. ...................... 178/3
6,647,265 B1 * 11/2003 Olofsson et al. ............. 455/445
(Continued)

FOREIGN PATENT DOCUMENTS

EP 1 478 139 A2 11/2004
EP 1 841 148 A1 10/2007
(Continued)

OTHER PUBLICATIONS

Office Action issued Jul. 23, 2014 in United Kingdom Patent Application No. GB1018846.4.
(Continued)

*Primary Examiner* — Shaq Taha
(74) *Attorney, Agent, or Firm* — Oblon, McClelland, Maier & Neustadt, L.L.P.

(57) ABSTRACT

A mobile communications network for communicating data to/from mobile communications devices, including a core network part including plural infrastructure equipment, and a radio network part including plural base stations communicating data to/from the mobile communications devices. The mobile communications device communicates an indication of a relative type of data packets for communication via a communications bearer for supporting a communications session of the mobile communications device, the indication used to configure the communications bearer, and provides the communications bearer from the mobile communications device to one or more of the infrastructure equipment via the base stations in accordance with the indication and to control the communication of the data packets via the communications bearer in accordance with the indication communicated via the communications bearer, to control the communication of the data packets from the communications bearer differently to data packets communicated via other communications bearer having a higher priority.

23 Claims, 11 Drawing Sheets

(51) Int. Cl.
*H04W 28/12* (2009.01)
*H04W 88/08* (2009.01)

(56) References Cited

U.S. PATENT DOCUMENTS

| | | | |
|---|---|---|---|
| 2005/0220069 A1* | 10/2005 | Li et al. ..................... | 370/349 |
| 2007/0142028 A1* | 6/2007 | Ayoub et al. ............ | 455/404.1 |
| 2007/0259673 A1 | 11/2007 | Willars et al. | |
| 2008/0279139 A1 | 11/2008 | Beziot et al. | |
| 2009/0086705 A1 | 4/2009 | Zisimopoulos et al. | |
| 2009/0129326 A1* | 5/2009 | Kim et al. .................. | 370/329 |
| 2009/0296630 A1* | 12/2009 | Chen et al. ................. | 370/328 |
| 2010/0130218 A1* | 5/2010 | Zhang et al. ............... | 455/450 |
| 2010/0272078 A1* | 10/2010 | Pani ..................... | H04W 28/06 370/336 |
| 2011/0222406 A1* | 9/2011 | Persson et al. ............. | 370/236 |
| 2011/0310804 A1* | 12/2011 | Beygzadeh ............ | H04W 68/00 370/328 |
| 2012/0008525 A1* | 1/2012 | Koskinen ..................... | 370/253 |
| 2012/0008601 A1 | 1/2012 | Zisimopoulos et al. | |
| 2012/0099416 A1* | 4/2012 | Bekiares et al. ............. | 370/216 |
| 2012/0106431 A1* | 5/2012 | Wu ......................... | H04W 4/00 370/312 |
| 2012/0149386 A1 | 6/2012 | Kumar et al. | |
| 2012/0269167 A1* | 10/2012 | Velev et al. ................. | 370/331 |
| 2013/0064078 A1* | 3/2013 | Guo ............................ | 370/229 |
| 2013/0286827 A1 | 10/2013 | Zakrzewski | |
| 2013/0286838 A1 | 10/2013 | Zakrzewski | |

FOREIGN PATENT DOCUMENTS

| | | |
|---|---|---|
| EP | 1 976 196 A1 | 10/2008 |
| GB | 2 404 531 A | 2/2005 |
| GB | 2460346 A | 12/2009 |
| JP | 2003-506981 A | 2/2003 |
| JP | 2006-514510 | 4/2006 |
| JP | 2007-281865 A | 10/2007 |
| WO | WO 00/42789 A1 | 7/2000 |
| WO | WO 02/37754 A2 | 5/2002 |
| WO | WO 03/107697 A1 | 12/2003 |
| WO | WO 2005/112364 A1 | 11/2005 |
| WO | WO 2007/022441 A1 | 2/2007 |
| WO | WO 2009/040260 A1 | 4/2009 |
| WO | WO 2010/033872 | 3/2010 |
| WO | WO 2010/056158 A1 | 5/2010 |
| WO | WO 2011/006889 A1 | 1/2011 |
| WO | WO 2011/021377 A1 | 2/2011 |

OTHER PUBLICATIONS

U.S. Appl. No. 13/884,124, filed May 8, 2013, Zakrzewski.
U.S. Appl. No. 13/884,065, filed May 8, 2013, Zakrzewski.
U.S. Appl. No. 13/884,033, filed May 8, 2013, Zakrzewski.
U.S. Appl. No. 13/884,106, filed May 8, 2013, Zakrzewski.
Search Report issued Mar. 8, 2011 in United Kingdom Patent Application No. GB1018846.4.
International Search Report issued Jul. 2, 2012 in PCT/GB2011/052104.
"Machine-to-Machine communications (M2M); Functional architecture" ETSI Draft, vol. 0.6.2, XP014062925, Oct. 14, 2010, pp. 1-116.
Samsung, et al. "Identifier in the request for the (MTC) communications that should be discriminated for the overloaded/congested network" 3GPP Draft, vol. SA WG2 TD, XP050458440, Aug. 24, 2010, pp. 1-6.
Japanese Office Action issued on Jul. 21, 2015 in Japanese Application No. 2013-538269.
"Considerations on MTC Device Indication," 3GPP TSG-RAN WG3 Meeting #69, Madrid, Spain, Aug. 23-27, 2010.
Office Action issued Nov. 4, 2015 in Japanese Patent Application No. 2013-538269.

* cited by examiner

| The mobile communications device attaches or registers with the mobile communications network, which may be at power on. As part of the attach/registration procedure the mobile communications device communicates context data which includes access parameters, which may include an indication of the type of data packets to be communicated such as a low priority indicator or an indication that the data packets to be communicated via the communications bearer are for an MTC application program or both of these indicators. |

S2  S4

| The mobile communications network creates a communications bearer from the mobile communications device and a PDN Gateway using the access parameters. The mobile communications network creates a default bearer based on the access parameters communicated by the mobile communications device and/or access indications stored in the network, such as for example in the MME or the HSS. |

S6

| If the access indications stored in the mobile communications network indicate that the mobile communications device can be provided with a communications bearer for the requested type of data packets then the default bearer for that type is provided, or if the access indications indicate that the mobile communications device should not be provided with a communications bearer for the requested type, then the default communications bearer is set for the access indications stored in the network. |

FIG. 6

| An application program on the mobile communications device may request a dedicated bearer as part of AS or NAS signalling messages communicated to the mobile communications network. The AS or NAS messages may include an indication of the type of data packets to be communicated such as a lower priority indicator or an indication that the data packets to be communicated via the communications bearer are for an MTC application program or both. The dedicated communications bearer may be established by the communications network from an existing PDN Gateway or another PDN gateway using a different Access Point Name. |

S8  S10

| Alternatively, the mobile communications device may request a dedicated bearer for an applications program by communicating a bearer modification message, which includes an indication of the type of data packets to be communicated via the communications bearer as well as other parameters. |

S12

| The mobile communications network may provide the dedicated communications bearer by converting one communications bearer to a dedicated bearer, with different configuration parameters for establishing a new communications bearer. |

FIG. 7

MOBILE COMMUNICATIONS NETWORK, INFRASTRUCTURE EQUIPMENT, MOBILE COMMUNICATIONS DEVICE AND METHOD

FIELD OF THE INVENTION

The present invention relates to mobile communications networks for communicating data to and/or from mobile communications devices, infrastructure equipment and methods for communicating data packets.

BACKGROUND OF THE INVENTION

Mobile communication systems have evolved over the past ten years or so from the GSM System (Global System for Mobiles) to the 3G system and now include packet data communications as well as circuit switched communications. The third generation project partnership (3GPP) has now began to develop a mobile communication system referred to as Long Term Evolution (LTE) in which a core network part has been evolved to form a more simplified architecture based on a merging of components of earlier mobile communications network architectures and a radio access interface which is based on Orthogonal Frequency Division Multiplexing (OFDM) on the downlink and Single Carrier Frequency Division Multiple Access (SC-FDMA) on the uplink. The core network components are arranged to communicate data packets in accordance with an enhanced packet communications system.

At present mobile communications services are dominated by human to human (H2H) communications, that is, data which is transmitted by a human to another human or at least data that is transmitted for presentation to a human being. It is now recognised that there is a desire to cater for communications to and/or from machines which are referred to generally as machine type communications (MTC) or machine to machine (M2M) communications. MTC communications can be characterised as communicating data which has been generated from a source automatically, for example in response to some other stimulus or event reporting some attribute of the machine or some monitored parameter or so-called smart metering. Thus whilst human communications such as voice can be characterised as being communications requiring a communications session of some minutes with data being generated in bursts of several millisecond with pauses there between or video can be characterised as streaming data at a substantially constant bit rate, MTC communications can generally be characterised as sporadically communicating small quantities of data although it would be appreciated that there is also a wide variety of possible MTC communications.

As will be appreciated it is generally desirable to provide a mobile communications system and network which can operate efficiently, particularly although not exclusively in respect of the challenges presented by communicating data packets generated by MTC communications devices.

SUMMARY OF THE INVENTION

According to the present invention there is provided a mobile communications network for communicating data to and/or from mobile communications devices, the mobile communications network comprising a core network part including a plurality of infrastructure equipment, and a radio network part including a plurality of base stations which are provided with a wireless access interface for communicating data to and/or from the mobile communications devices. The mobile communications device is arranged in operation to communicate an indication of a relative type of data packets for communication via a communications bearer for supporting a communications session of the mobile communications device, the indication of the type of the data packets being used to configure the communications bearer. The mobile communications network is arranged to provide the communications bearer from the mobile communications device to one or more of the infrastructure equipment via one or more of the base stations in accordance with the indication of the type of the data packets and to control the communication of the data packets via the communications bearer in accordance with the type of data packets being communicated via the communications bearer.

By providing an indication of the relative type of the data packets, such as an indication that the data packets are of low priority or are generated or being received by a machine type communication application, the mobile communications network can control the communication of the data packets from the communications bearer differently to data packets communicated via other communications bearer having a higher priority. In one example the mobile communications network buffers data packets from a low priority and/or machine type communication application but not data packets of a higher priority, when the mobile communications network is experiencing congestion.

The inventor has recognised that some applications programs such as for example machine type communications can require the communication of data packets cyclically, that is to say at regular intervals. Even if these are small amounts of data packets a periodic communication from applications can cause congestion on a mobile communications network, if the periodic nature of the communication of data packets from these applications programs coincides.

According to the present technique a mobile communications device which is arranged to establish a communications bearer is arranged to provide an indication to the mobile radio network when either requesting a bearer, establishing a bearer or modifying a bearer which indicates relative type of the data to be communicated. In one example, the type of the indicated data is a low priority indicator and another example is an indicator providing an indication that the data communicated is for an MTC application. Accordingly embodiments of the present technique can:

Dynamically set access indicators per application and/or traffic type, for example an MTC indication and a low priority indication so called access/traffic type indications;

Set and/or modify indicators in the context information stored in the system;

Gather statistical information of the communications network entities;

Control the mobile communications network in accordance with the indicated traffic;

Modify the system to enable setting up and modifying these indicators in a flexible manner.

A low priority indicator and an MTC indicator are used in the AS access messages as well as in the NAS access messages. The use of these indicators is governed by configuration parameters which remain usually fixed for the time the mobile communications device is attached to the network (some exceptions are possible as explained above). According to the present technique a scheme is proposed which enables a dynamic configuration of communications bearers based on the traffic type generated by applications programs. For example an MTC application may report some maintenance parameters of a car, an emergency handling application, a mail client synchronizing mailbox every hour, an H2H application allowing to make a VoIP call etc.

In one example the control of the communication of the data packets includes storing and/or discarding the data packets which are of a lower priority and/or and for communication from or to a machine type communication application and preferentially not storing and/or discarding data packets communicated via other communications bearers of a higher priority. As such, for example congestion on the mobile communications network can be managed by reducing the communication of data packets from lower priority or MTC applications.

According to an aspect of the present invention there is provided an infrastructure equipment for forming part of a mobile communications network for communicating data to and/or from a mobile communications devices. The infrastructure equipment is arranged in operation to receive an indication of a relative type of data packets for communication via a communications bearer for supporting a communications session of a mobile communications device, the indication of the type of the data packets being used to configure the communications bearer, to provide the communications bearer from the mobile communications device in accordance with the indication of the type of the data packets, and to control the communication of the data packets via the communications bearer in accordance with the type of data packets being communicated via the communications bearer.

Further aspects and features of the present invention are defined in the appended claims and include a communications device for forming an associated group of communications devices and a method of communicating data.

BRIEF DESCRIPTION OF THE DRAWINGS

Example embodiments of the present invention will now be described with reference to the accompanying drawings in which like parts have the same designated references and in which:

FIG. 6 is a flow diagram illustrating a process in which a mobile communications device establishes or configures a communications bearer for low priority and/or MTC type data packets reflecting the example of FIG. 4;

FIG. 7 is a flow diagram illustrating a process in which a mobile communications device establishes or configures a communications bearer for low priority and/or MTC type data packets, which reflects the example shown in FIG. 6;

DESCRIPTION OF EXAMPLE EMBODIMENTS

Figure 1:
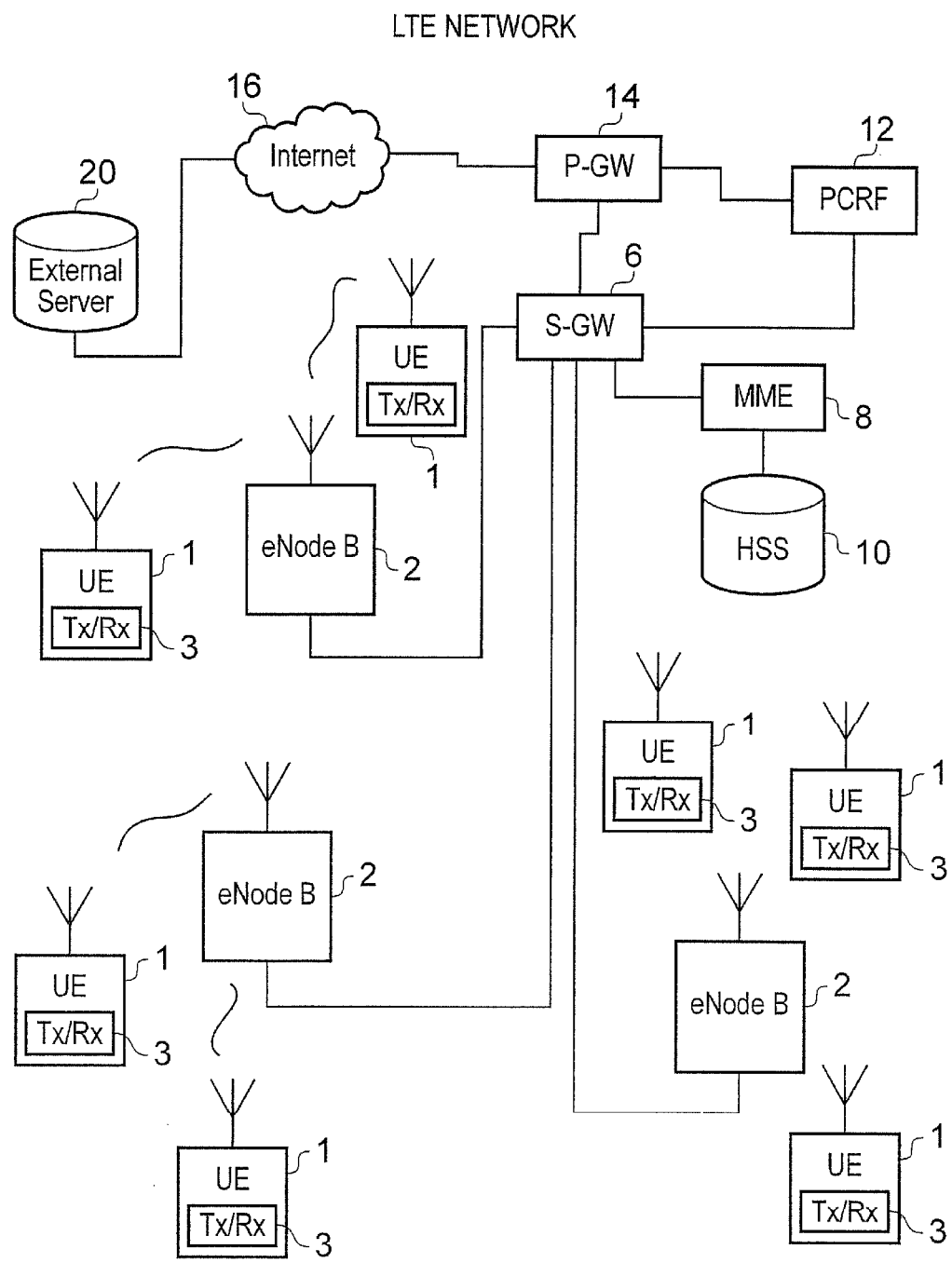
FIG. 1 is a schematic block diagram of a mobile communications network and mobile communications devices fainting a communication system which operates in accordance with the 3GPP Long Term Evolution (LTE) standard.

Embodiments of the present invention will now be described with reference to an implementation which uses a mobile communications network operating in accordance with the 3GPP Long Term Evolution (LTE) standard. FIG. 1 provides the example architecture of an LTE network. As shown in FIG. 1 and as with a conventional mobile communications network, mobile communications devices (UE) 1 are arranged to communicate data to and from base stations 2 which are referred to in LTE as enhanced NodeBs (eNodeB). For transmitting and receiving data via the wireless access interface the communications devices 1 each include a transmitter/receiver unit 3.

The base stations or eNodeB's 2 are connected to a serving gateway S-GW 6 which is arranged to perform routing and management of mobile communications services to the communications devices 1 as they roam throughout the mobile communications network. In order to maintain mobility management and connectivity, a mobility management entity (MME) 8 manages the enhanced packet service (EPS) connections with the communications devices 1 using subscriber information stored in a home subscriber server (HSS) 10. Other core network components include the policy charging and resource function (PCRF) 12 a packet data gateway (P-GW) 14 which connects to an internet network 16 and finally to an external server 20. More information may be gathered for the LTE architecture from the book entitled "*LTE for UMTS OFDM and SC-FDMA based radio access*", Holma H. and Toskala A. page 25 ff.

In the following description LTE/SAE terminology and names are used. However embodiments of the present technique can be applied to other mobile communications systems such as UMTS and GERAN with the GPRS core network.

Bearer Configuration

Example embodiments of the present technique provide an arrangement for allowing the coexistence of MTC applications and normal applications which are deployed in common purpose or dedicated devices. At present, the Long Term Evolution/Enhanced Packet Communication (LTE/EPC) system (release-10) proposes to configure a device as either a low priority device or an MTC device. The MTC indication must be used for mobile communications devices configured for MTC applications (MTC devices) whereas the low priority indication may be used for all devices i.e. regular human to human as well as MTC devices. The MTC indication is stored as context data at the MME, SGW and PDN-GW whereas a low priority indication may be stored in the network to assist generation of charging records. A low priority indicator is usually indicated by an Allocation Retention Priority (ARP) value which is one of parameters which define the quality of service QoS parameters for communications bearers. The ARP values determine how the network should treat data packets sent over these communications bearers and indirectly how to treat users generating these data packets. These additional bearer parameters such as an MTC indication is not reflected in QoS parameters and can only be taken into account by logical entities which store this additional MTC indicator information for example in the S-GW and PDN-GW.

At present a device can be configured during the manufacturing process or later with help of the OMA DA and/or (U)SIM OTA procedures. Once the device has been configured, the configuration is valid at least for the time the device is attached to the network. The device cannot change its configured parameters, but the network can change these parameters with the help of the aforementioned procedures. However this would not happen frequently as the main purpose of these procedures is to enable initial configuration, for example at the first attach or when the equipment has been changed rather than allowing frequent re-configuration. Furthermore known mobile communications networks do not establish or configure a communications bearer in accordance with a low priority or an MTC indication.

According to the present technique a mobile communications device which is arranged to establish a communications bearer is arranged to provide an indication to the mobile communications network when either requesting a bearer or modifying an existing bearer which indicates a relative type of the data to be communicated. In one example, the type of the indicated data is a low priority indicator and another example is an indicator providing an indication that the data communicated is for an MTC application. Accordingly embodiments of the present technique can:

Dynamically set access indicators per application and/or traffic type, for example an MTC indication and a low priority indication so called access/traffic type indications;
Set and/or modify indicators in the context information stored in the system;
Gather statistical information of the communications network entities;
Control the mobile communications network in accordance with the indicated traffic;
Modify the system to enable setting up and modifying these indicators in a flexible manner.

A low priority indicator and an MTC indicator are used in the access stratum (AS) access messages as well as in the non-access stratum (NAS) access messages. The use of these indicators is governed by configuration parameters which remain usually fixed for the time the mobile communications device is attached to the network (some exceptions are possible as explained above). According to the present technique a scheme is proposed which enables a dynamic configuration of communications bearers based on the traffic type generated by applications programs. For example an MTC application may report some maintenance parameters of a car, an emergency handling application, a mail client synchronizing mailbox every hour, an H2H application allowing to make a VoIP call etc.

As explained above, in accordance with the presently proposed LTE/EPC standard (Release-10) two indicators have been introduced to denote an MTC device and a low priority device. The MTC indication must be used for UEs configured for MTC (MTC devices) whereas the low priority indication may be used for all devices i.e. regular and MTC devices. The MTC indication is stored as context data at the MME, SGW and PDN-GW whereas a low priority indication may be stored in the network to assist generation of charging records. At present these indications are used to govern access priority at the AS and NAS level. Since these indications are associated with the mobile communications device configured in a semi static way, the same indications are always used at the access time. This may have an implication that some or all of the communications bearers configured by these devices will have the same indications stored as a part of their context information.

According to the present technique the mobile communications device is allowed to send in the AS and/or NAS messages indicators which may signal not only a device type (as it is at present) but also application type or traffic type. Typically an application type would be:
MTC application of a low priority
H2H application
H2H application of a low priority
MTC application The Application type may reflect traffic types which may have any properties from the following list:
1. Delay tolerant data
2. MTC data, automatically generated where the synchronized access is possible
3. Normal priority data
4. Low priority data
5. High priority data This information is taken into account when granting initial access. In subsequent access attempts, the mobile communications device and indirectly an application program triggering the access may use different access indications. The system might also authorize an application to use certain access/traffic identifiers. For example, an application needs to be digitally signed and at the attach time the system grants permission for the application to use certain access indications. A mobile communications device's operating system checks the applications' behaviour and verifies that only digitally signed applications are installed and executed) and/or the system monitors access parameters used by devices whether the device complies with the Service Level Agreements (SLA) signed with a service provider or with the operator.

A further embodiment of the present technique can provide an attach procedure, which leads to at least the default bearer establishment. For the default bearer access indications are stored in the system. However, the mobile communications device can also signal these indicators explicitly.

Should a dedicated bearer be established later, the indicators used at the access time are stored per bearer. These indicators are supplied explicitly by the network if the dedicated bearer establishment procedure is initiated by the network or optionally by the mobile device. This is applicable to the mobile device's initiated procedure in the case when access parameters for a bearer are to be different to the access parameters used by the mobile device at the access time. When multiple bearers are created in one access attempt the mobile communications device or the network can signal them explicitly per bearer in the NAS messages unless the indicators used at the access time are used for all bearers.

In another example embodiment the network can modify the access indication information stored in the core network entities by using the existing bearer modification procedure with a minor enhancement adding new access parameters to the messages so that it can be signalled which indications need to be updated/changed.

In another example the mobile communications device may also request the bearer to be modified and can either supply access parameters to be used or if this information is not provided the indicators used at the access time are used instead.

In a further example communications bearers may be provided with different access indications associated with the same or different APNs. The communications bearers can be distinguished in the system because the indicators associated with bearers are stored as part of their context information. This allows the network to differentiate handling for the C-Plane and/or U-Plane data coming from different applications and/or data sources. It is possible that the same application may generate different traffic types so access indications could vary for subsequent access attempts. It is possible that the mobile communications device may use different access indications to those stored in the bearer contexts as only the bearer modification procedure is used to modify bearer contexts.

Other examples can provide the following aspects:

Once the access has been granted other applications may send/receive data irrespective of their access indicators. Supposing the access was denied, the application requiring less restrictions, may still initiate subsequent access attempts using different indicators. However any application with equal or lower rights would be blocked.

The system may assign priorities to access attempts according to the list from the highest priority to the lowest such as: Highest priority: MTC indication set, Normal priority: No indicators set, Low priority: low priority indication set, Lowest priority: MTC and low priority indications set;

When the system blocks higher priority access all lower priority access attempts are implicitly blocked with the same restriction applied to them When the system blocks lower priority access, higher priority access can be made. If the system also blocks higher priority access, the restriction implicitly apply to lower priority accesses unless the system provided restrictions explicitly.

There might be more priority levels as indicated by the APR values.

Figure 2:
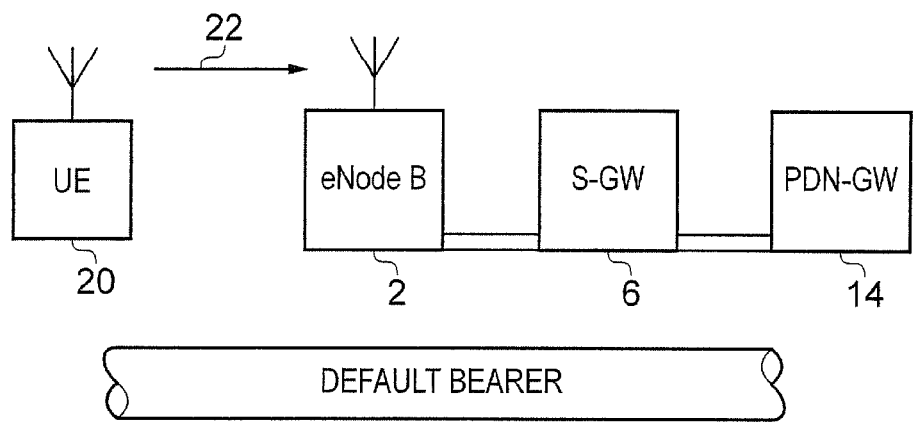
FIG. 2 is a schematic block diagram of network elements which are shown in FIG. 1 which are arranged to communicate data packets to and/or from a mobile communications devices via a communications bearer for the mobile communications network shown in FIG. 1.

More detailed example implementations embodying the present technique will now be explained. FIG. 2 provides an example illustration in which a mobile communications device 20 communicates a request for a communications bearer which may be as part of an attached procedure followed by the mobile communications device 20 when attaching to the mobile communications network. As shown in FIG. 2, the mobile communications device 20 communicates the attach or request message to an eNodeB 2 which is further communicated to a serving gateway S-GW 6 which is attached to the eNodeB 2 and then to the packet data gateway PDN-GW 14. However, in accordance with the present technique the mobile communication device 20 may be running one or more applications programmes.

Figure 3:
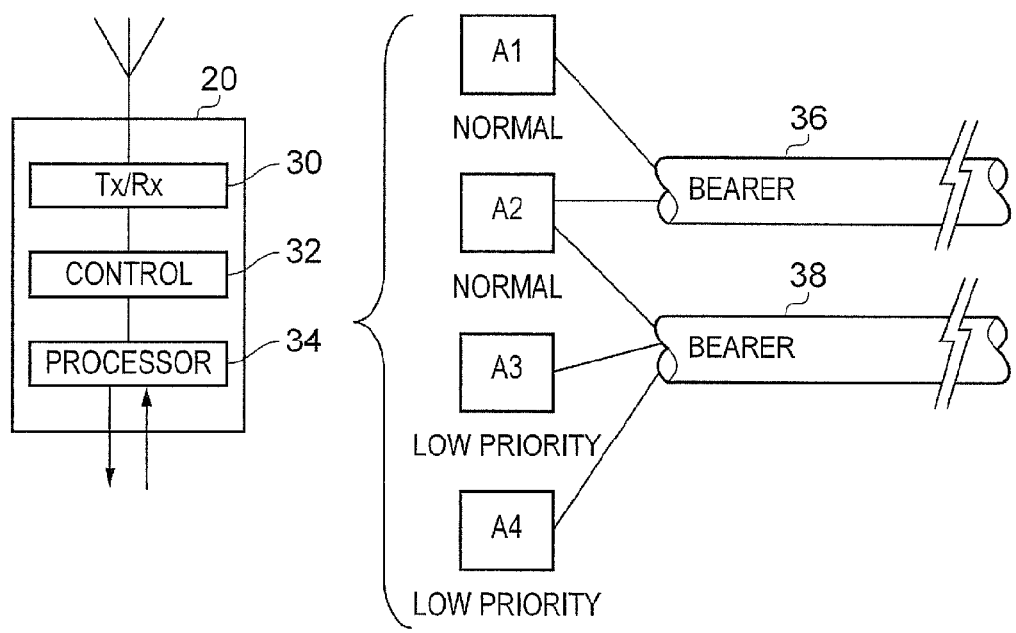
FIG. 3 is a schematic representation of a mobile communications device illustrating four applications programs operating on the communications device using two communications bearers.

According to the present technique each of one or more applications programs which are running on the mobile communications device may access one or more communications bearers for supporting communications servers provided by those application programs. Thus, as illustrated in FIG. 3 the mobile communications device 20 may include a transceiver unit 30, a control processor 32 and a program execution processor 34. The control processor 32 controls the transceiver unit which communicates radio signals via a wireless access interface to the eNode B 2 for communicating data packets to and from the mobile communications network. As shown in FIG. 3 the processor 34 is arranged to execute a plurality of applications programs in this example four application programs A1, A2, A3 and A4 are being executed by the processor in order to provide communications service to a user. However, as illustrated in FIG. 3 the four application programs A1, A2, A3, A4 communicate data via two bearers 36, 38 which are established by one or more of the applications programs A1, A2, A3, A4.

As will be familiar to those acquainted with the LTE standard, the mobile communications device can establish or modify a default bearer or a dedicated bearer. Examples are shown in FIG. 3. In FIG. 3 when the mobile communications device 20 is first switched on the message 22 sent to the mobile communications network is a register/attach message. Accordingly, the mobile communications network establishes a default bearer using parameters which may be provided for example in the HSS of the mobile communications network. However, the communications device 20 may later request a dedicated bearer according to certain parameters by sending a corresponding message to the MME which establishes for example a dedicated bearer to the same PDN-GW or access points name APN1. Equally the mobile communications device may establish a dedicated bearer to a different PDN GW with a different access point name APN2. However, the present technique provides an arrangement for signalling a relative priority of the data to be communicated via a default or a dedicated bearer 36, 38 which allows the mobile communications network to differentiate the communication of data packets via those bearers to the effect of controlling the communication differently depending on the type of bearer. In one example, if the communications bearer is established with an indication that it is a low priority bearer of data packets or that the data packets are communicated for a MTC type communication then one more nodes of the mobile communications network can for example buffer those data packets for a pre-determined time when the network is congested in order to control that congestion. An example of a communication of request messages from the mobile communications device 20 which provides an indication of either a low priority message or an MTC configuration message is provided in FIG. 5.

Figure 5:
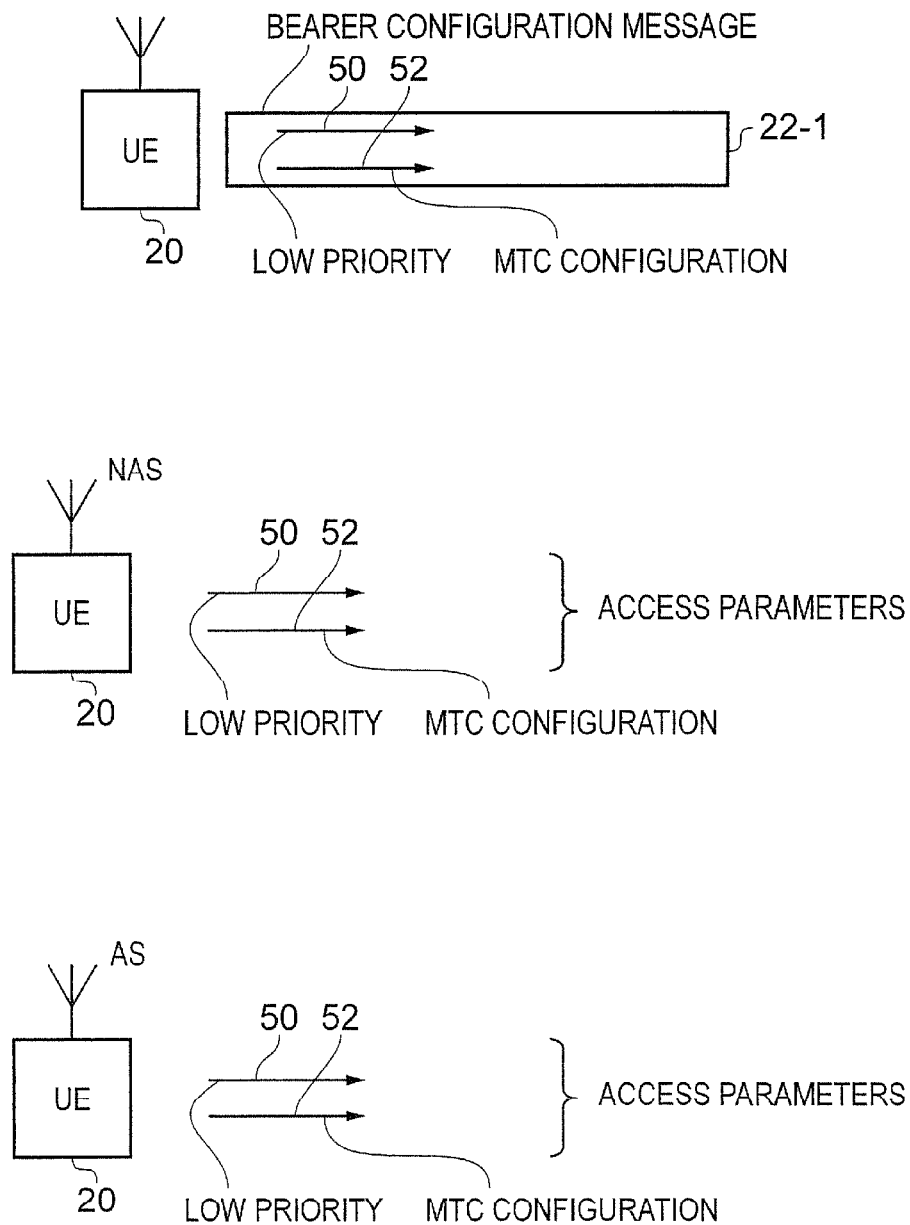
FIG. 5 is a part schematic diagram part flow diagram illustrating examples in which the mobile communications device generates and communicates messages which include an indication that the data packets are low priority or that the data packets are generated by an MTC application or device.

In FIG. 5 a bearer configuration message 22.1 is shown to include a low priority message 50 and an MTC configuration indicator 52. However, although the bearer configuration message may be communicated at the point of attachment to the mobile communications network in other examples the mobile communications device may be communicating access parameters in order to establish or modify a bearer which may be part of AS or NAS communications. Accordingly FIG. 5 provides examples illustrating the communication of the low priority indicator 50 or the MTC indicator 52 for both AS communications and NAS communications.

As will be appreciated with those familiar with LTE, bearers are only configured once, after which they can be modified or released. However, access parameters can vary per access despite the fact that the bearer is established. These access parameters can be at AS level, for example in the RRC Connection Request and NAS level, for example in the Service Request message.

Returning to FIG. 3 and in accordance with the present technique each of the plurality of application programs A1, A2, A3, A4 may communicate data packets in accordance with a different type having a different priority. For example, the first two applications programs A1, A2 communicate data packets in accordance with a normal priority whereas the second applications programs A3, A4 communicate low priority data. In one example if access is granted to a first applications program A1 to communicate via one or more of the communications bearers 36, 38 access will be granted to the second applications program A2 after receiving either a bearer configuration message or an NAS or AS message providing a request for the relative priority of the data packets to be communicated. In another example if one of the second two applications programs A3, A4 communicates a request for low priority communications via the bearers 38 then if this request is denied the MME then data cannot be communicated via the first two applications programs A1, A2 unless they request normal priority access and the system grants the access. On the contrary, if the applications program A1 is allowed to communicate normal priority data then low priority data packets from the third and the fourth applications programs A3, A4 will be allowed.

As will be appreciated the access to a communications bearer may be granted by different entities within the mobile communications network. For example, at the AS level, the eNodeB manages the access, whereas at NAS level, the MME manages the access. In respect of the bearer configuration, this happens once and all nodes on the U-Plane path need to provide authorisation.

Figure 4:
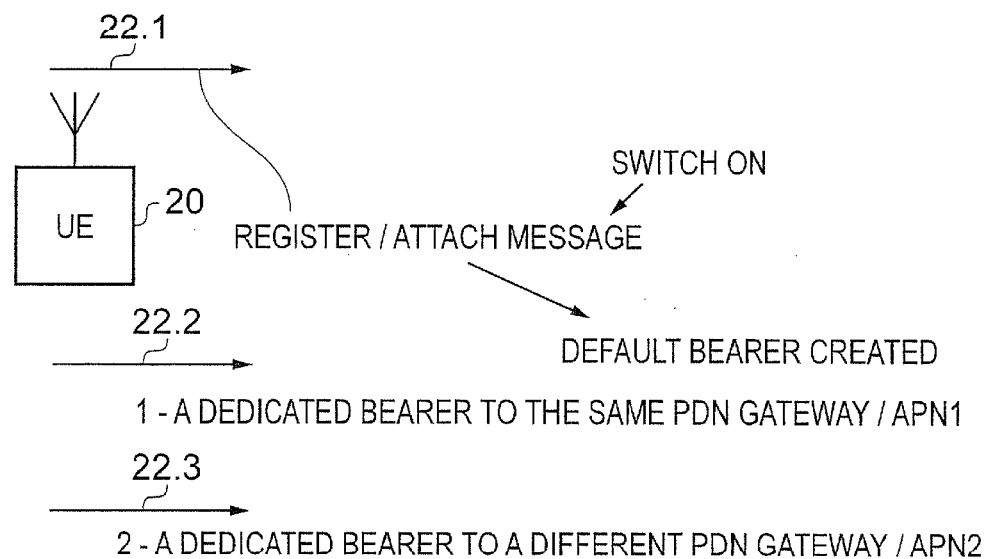
FIG. 4 is a part schematic diagram part flow diagram illustrating examples in which the mobile communications device generates and communicates bearer establishment or configuration messages.

Thus, according to the present technique and as illustrated by FIGS. 3, 4 and 5, the present technique provides a facility for an applications program to configure a bearer for communicating data packets with the effect that the applications program can identify the type of data packets which are being communicated by the communications bearer and accordingly the mobile communications network can adapt the configuration of the communications bearer so that packets which are communicated by that bearer are treated differently with respect to the relative type of those data packets with respect to other types of data packets. For example the data packets may be identified as either low priority or MTC data packets or both and communication adapted accordingly. A summary process of illustrating the present technique is provided in FIG. 6 which is summarised as follows:

S2: The mobile communications device performs an attach or registration procedure in which the device initially attaches to the mobile communications network. This may be for example when the mobile communications device is powered on. As part of the attachment or registration procedure the mobile communication device communicates some context data which includes access parameters. The access parameters in accordance with the present technique may include an indication of the type of data packets to be communicated such as a low priority indicator or an indication that the data packets to be communicated via the communications bearer are for an MTC application program running on the communications device. The type indicators may include a combination of the low priority indicator and the MTC application indicator.

S4: The mobile communications network then creates a communications bearer of a default type from the mobile communications device to a PDN-GW using the access parameters provided by the mobile communications device. The mobile communications network creates a default bearer based on the access parameters communicated by the mobile communications device and/or access indications stored in the network such as for example access indications stored in the mobility management entity (MME) 8 or the homes subscriber server (HSS) 10.

S6: If the access indications stored in the mobile communications network indicate that the mobile communications device can be provided with the communications bearer for the requested type of data packets indicated by the mobile communications device then the default bearer of that type is provided or if the access indications indicate that the communications device should not be provided with the communications bearer for the requested type then the default communications bearer is set for the access indications stored in the network. Thus the mobile communications network controls the type of default bearer which is deployed to the mobile communications device but considers the type of bearer requested by the mobile communications device. For example, if the access indications stored in the mobile communications network allow a normal type of communications bearer then the request for a low priority and or MTC application bearer will be provided as a default bearer.

Having established a communications bearer for communicating data packets from and to the mobile communications device, the mobile communications device may have a requirement to be provided with a dedicated communications bearer. A dedicated bearer can be established using access parameters or the access parameters for an established dedicated bearer can be modified. Similarly the parameters of a default bearer can be modified. This may be for example because an application program executed on the communications device may require the communication of data packets of a particular type. Accordingly a flow diagram illustrated in FIG. 7 may be executed which is summarised as follows:

S8: An application program on the mobile communications device may request a dedicated bearer as part of the AS or NAS signalling messages which may be communicated to the mobile communications network as a result of conventional signalling activity but may include an indication of the type of data packets to be communicated. For example, the AS or NAS messages may include an indication that the data packets of a low priority or an indication that the data packets communicated are for an MTC application program or combination of these two messages. The dedicated communications bearer may then be established by the communications network from an existing PDN-GW or another PDN-GW using a different access point name.

S10: Alternatively the mobile communications device may request a dedicated bearer for an applications program by communicating a bearer modification message which may include an indication of the type of data packets to be communicated via the communications bearer as well as other parameters.

S12: The mobile communications network may provide the dedicated communications bearer by establishing a new communications bearer which operates in parallel with the default communications bearer.

As will be appreciated in accordance with the present technique an application program executing on the mobile communications device is responsible for signalling the type of data packets which are to be communicated for a configured communications bearer. In accordance with one example operators of the mobile communications network may set a lower tariff for MTC communications and or lower priority communications thereby incentivising a user operating the applications program to configure the applications program to request a communications bearer for lower priority data packets and or MTC application data packets.

User Plane Control: Differential Treatment of Data Packets by the Network

As explained above, the current state specifying the LTE/EPC system (release 9) is not capable of distinguishing between MTC devices and regular users. However although effort has been spent to address this deficiency for C-Plane data, U-Plane data can be only differentiated by common set of QoS parameters which are the same for regular and MTC users. This approach might not be sufficient when the mobile communications network handles data generated by these MTC communications devices, which may be relevant to situations such as when the network is about to be fully utilized and is about to experience or is experiencing congestion. It has been currently proposed that when data has been received for mobile communications device, which is in the IDLE mode the S-GW is required to buffer the down-link data and sends a downlink Data Notification message to the MME. This may take into account a low priority indication and/or MTC indications. The data has to traverse up to the S-GW where it is buffered and optionally discarded in some circumstances. This buffering only occurs if the mobile communications device is in the IDLE mode when data is to be communicated to the mobile communications device on the down-link. However the present technique proposes to buffer up-link data to be transmitted from the mobile communications device to the mobile communications network.

The mobile communications network also consists of IP routers which can be placed on the path between the PDN-GW and the S-GW however these nodes do not understand the notion of bearers and usually use some marking to apply the same traffic handling for bearers having the same set of QoS parameters. For example, the communications network might be fully utilized or is about to/is experiencing congestion. The routers would apply standard congestion control mechanisms to start buffering and later start discarding of data which has a detrimental effect on all users. Nodes which have some additional information available may act in an intelligent way to support IP routers either in attempt to prevent the congestion from occurring or to assist the routers in the process of resolving the congestion and preventing the waves or the so called synchronization effect when the congestion is resolved the network is stressed with outstanding/backlogged data which leads to yet another congestion.

A controller device may be introduced to use an algorithm to control the process when the selected group of data is flashed from buffers or is discarded. The algorithm might use variable timers controlled by additional parameters provided by the network such e.g. current system utilization and/or congestion notifications etc in order to stagger a time at which the buffers are flushed.

Figure 8:
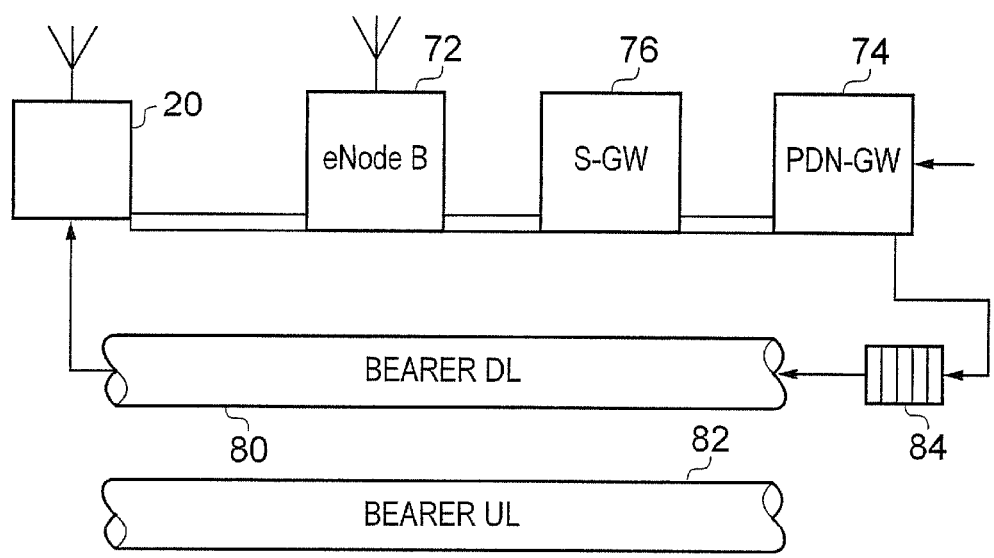
FIG. 8 is a schematic block diagram of network elements which are shown in FIG. 1 which are arranged to communicate data packets to and/or from a mobile communications devices showing an up-link communications bearer separately from a down-link communications bearer.

FIG. 8 provides an illustrative representation of communication of data packets from a mobile communications device 20 to a PDN-GW 14 via an eNode B 2 and an S-GW (serving gateway) 6 which illustrates in a one dimensional arrangement the communication of data packets by the mobile communications network presented by FIG. 1. As shown in FIG. 8 two communications bearers are established for the communications device 20 which may be bi-directional but the example shown in FIG. 8 comprise a downlink bearer 80 and an uplink bearer 82.

As explained above, in accordance with a conventional arrangement the mobile communications device 20 may be either in an IDLE state or a CONNECTED state. When the communications device 20 is in an IDLE state and data packets are to be communicated to the mobile communications device 20 on the downlink then the data packets are stored in a data store 84 which acts as a buffer within the PDN-GW 14 until the mobile communications device has been changed to a CONNECTED state for example. Typically this is done by paging the mobile communications device that it is to receive downlink data packets.

According to the present technique each of the nodes which have control of or knowledge of a communications bearer between a mobile communications device and a PDN-GW (packet data network gateway) are provided with an indication of the type of data packets which are communicated by that bearer. In the one example the type of data packets may be indicated as either low priority data packets or data packets for communication to or from an MTC application. By providing knowledge of the type of data packets being communicated by the communications bearer the mobile communications network can control communications of the data packets for different communications bearers differentially favouring high priority data packets from low priority data packets and data from MTC applications. In one example the control of the communication of data packets is performed in order to control congestion on a mobile communications network.

Figure 9:
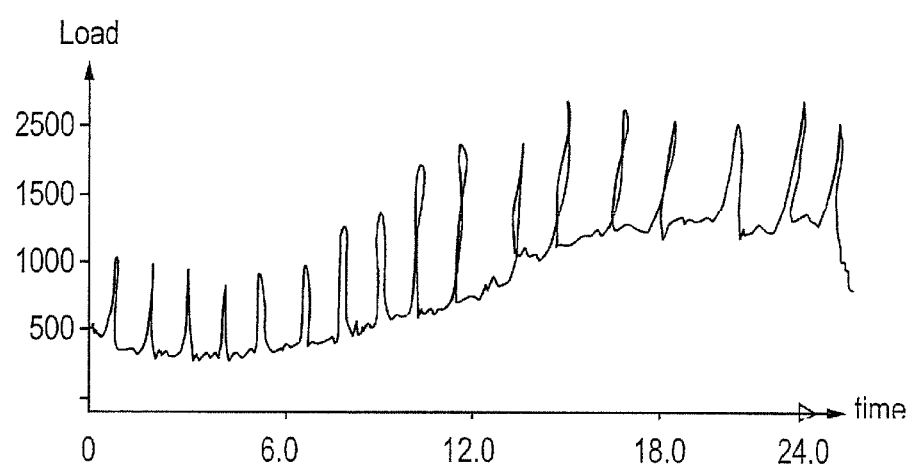
FIG. 9 is a graphical diagram representing a plot of load on a communications network in terms of data packets communicated with respect to time in a twenty four hour period.

FIG. 9 provides an illustrative graphical representation of load on a mobile communications network as a result of data packets communicated on a mobile communications network in a 24 hour period. Thus the x-axis shown in FIG. 9 is a plot of time over a 24 hour period and the y-axis represents a load illustrating a number of messages communicated per minute. As can be seen in FIG. 9 the network suffers significant peaks or surges in demand. These peaks in demand may be as a result for example of applications programs running on for example smart phones which synchronise for example mail boxes or signal requests for an update in the status or connectivity and download some data or upload information to a server. As explained this maybe as a result of various communications for example to check mailboxes or pull based methods or access social networking portals such as FACEBOOK™ or TWITTER™.

According to the present technique and as indicated above a mobile communications device can communicate access parameters for establishing a communications bearer which indicate the type of data packets to be communicated. Accordingly, one or more of the mobile communications device 20, the eNode B 72, the serving gateway 76, and or the PDN-GW 74 as well as the mobile communications device 20 maybe configured to store data packets for a low priority bearer and/or an MTC indicated bearer in preference to data communications packets communicated from other bearers of a higher priority type to the effect of controlling the communication of data packets via the mobile communications network. As explained above, in one example, control of the data packets via the mobile communications network may be made when the network is experiencing congestion. Thus, when congestion occurs, data packets from low priority sources and or MTC applications are stored in a data buffer until such time as congestion is reduced. The data packets in the data buffer may also be discarded in order to reduce congestion.

As indicated above, network elements such as the S-GW buffer down-link data for mobile communications devices which are in the IDLE state. However it is not known to provide an arrangement for handling data packets for the up-link direction or the downlink direction for mobile communications devices in the connected mode. According to the present technique a network element such as the S-GW may take into account other indicators such as the low priority indicator or the MTC application indicator, which is stored in its context information. Therefore it is proposed that the S-GW may initially start buffering and later as an option start discarding data according to the flowing priority list:

1. low priority data coming from MTC devices
2. low priority data
3. regular users and/or MTC users
4. high priority users (e.g. high priority MTC devices etc.)

This priority lists can be applied separately to buffering and data discarding tasks.

When the network notifies an infrastructure component that the congestion has been reduced or system utilization drops below certain threshold value the S-GW may start forwarding the buffered data in the order indicated by the priority list as follows:

1. Low priority data coming from MTC devices
2. low priority data
3. regular users and/or MTC users
4. High priority users (e.g. high priority MTC devices etc.)

There might be more priority levels as indicated by the ARP value.

This approach allows the communications network to flush data for regular users preventing congestion from re-occurring and avoid the risk of data being discarded by routers.

When the system is close to its full utilization, low priority MTC data are less likely to cause regular users to suffer and also they are buffered, for example at the source or in network nodes. As such the MTC devices will not need to retransmit the data packets and hence the will have an improved battery and utilization of radio resources (i.e. no need to retransmit the lost data) will be improved.

Figure 10:
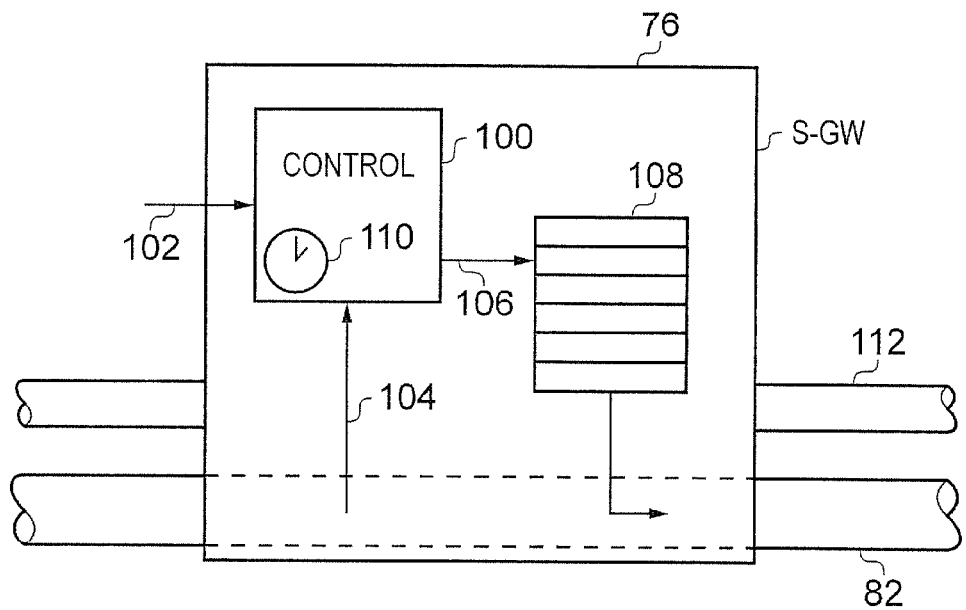
FIG. 10 is a schematic block diagram of a serving gateway forming part of the communications chain supporting the communications bearers shown in FIG. 8 adapted in accordance with the present technique.

An example illustration of one of the nodes shown in FIG. 8 is provided in FIG. 10 which is the serving gateway S-GW 76. As shown in FIG. 10 the S-GW 76 is arranged to control the communication of data packets via the uplink bearer 82. The S-GW 76 includes a control processor 100 which receives on an input 102 an indication that the control of data packets via the uplink bearer 82 should be buffered for example in order to reduce congestion. In one example the input 102 received by the control processor 100 is an explicit congestion notification (ECN) which is provided by a lower IP layer which informs the control processor 100 that there is congestion on the mobile communications network. Alternatively as explained below the input 102 to the control processor 100 may be provided by the MME or from an Operation and Maintenance Centre which receives other indicators that there is congestion on the mobile communications network. In another example explained below the prediction of the congestion is provided by counting the number of bearers which are provided by the mobile communications network and a type of those bearers and/or the utilisation of these bearers, which are compared with predetermined thresholds to provide an indication of the relative congestion on the network.

The control processor 100 of the S-GW 76 having determined that the communications of the data packets via the communications bearer 82 should be controlled then retrieves the data packets from the bearer 82 via a connecting channel 104 and stores the data packets by a further connecting channel 106 in a buffer 108. The control processor 100 then maintains the data packets in the data buffer 108 until such time as it determines that the network is no longer congested in which case it once again feeds the data packets out of the buffer into the communications bearer 82.

In another example the control processor 100 may discard data packets from the buffer 108 in order for example to control congestion. For example the control processor may include a clock 110 which is used to determine how long the data packets have been stored in the data store 108. After a certain time the data packets may be discarded.

The control processor operates to differentially buffer data packets and or discard data packets received by the uplink communications bearer 82 independence upon the type of data packets. Thus in one example if the data packets are low priority data packets then data packets from the communications bearer 82 are stored in preference to data packets communicated via another bearer 112 thereby differentially communicating data packets with respect to the other bearer 112. Accordingly, for example, congestion can be controlled within the mobile communications network.

Figure 11:
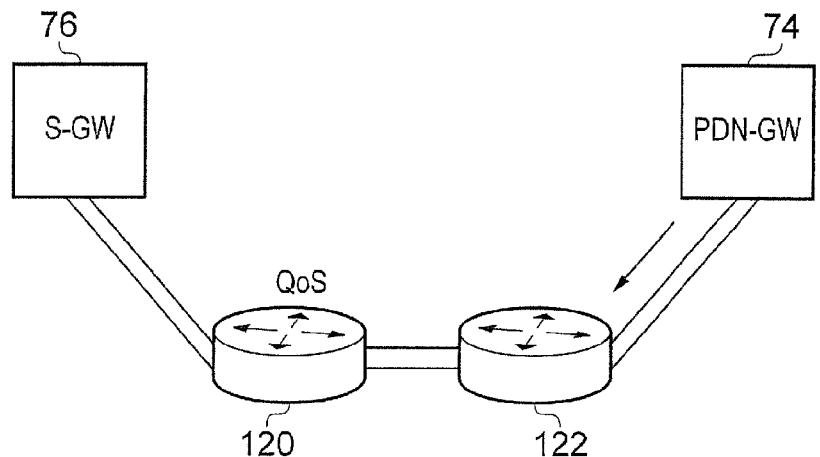
FIG. 11 is a schematic block diagram of a packet data network gateway and a serving gateway communicating using a communications bearer with a predetermined quality of service via two routers.

As will be appreciated the present technique differs from a conventional arrangement in which an internet protocol (IP) router differentiates the communication of IP packets based on a quality of service parameter. Thus the communication from the serving gateway 76 to the PDN-GW 74 maybe as illustrated in FIG. 11 via one or more routers 120, 122. Thus the routers operate at a lower layer to route data packets as IP packets from the PDN-GW gateway 74 to the S-GW 76. However the routers have no knowledge of the type of data packets being communicated via the communications bearer and can only use a quality of service (QoS) indication provided in the IP packet header in order to differentiate communication of those data packets. The present technique therefore addresses the communication at a higher layer of data packets such as IP packets from the communications network with respect to each bearer of the mobile communications network. The mobile communications network can be arranged to identify for each applications program a type of data packets communicated, for example as to whether these are low priority data packets and or MTC type data packets.

In one example the indication of the congestion received by the S-GW may be from any of the other communications nodes maybe from a subsequent node following that node in the chain of communications which faints the communications bearer. For example, the serving gateway (S-GW) 76 may request and receive confirmation from the packet data network gateway (PDN-GW) 74 as to whether or not the PDN-GW 74 is congested or not and if not forward the data packets from the buffer 108 and if it is congested retain the data packets within the buffer 108.

The aforementioned scenarios might become even more relevant when the LTE-Advance is introduced and the core network components are re-used leading to the situation that data aggregation points such as for example the S-GW and the back-bone transport network might become overloaded/congested or also the S5/S8 interfaces.

Although the example explained above has been given of an S-GW shown in FIG. 10 it will be understood that any of the eNodeB, the mobile communications device 20 or the PDN-GW can include a corresponding controller and data buffer, or indeed any other network entity which has the additional information available. Accordingly, example embodiments of the present technique can provide:

One or more core network entities (e.g. the S-GW) or radio access network entities which buffer or discard data according to an intelligent algorithm which takes into account some additional information stored in the context information and network input such as e.g. the current system utilization or congestion notification (e.g. the ECN notification at the IP layer);

A priority list is used to start/stop buffering and/or discarding for some group of users;

An algorithm is used how to link the input data with the handling functions implemented in some CN entities.

In summary the operation of the mobile communications network to control the flow of data packets differentially with respect to a type of the data packets is provided in FIG. 12 which is summarised as follows:

S20: The mobile communications network establishes a communications bearer for communicating data packets from a mobile communications device to a PDN-GW via a base station (eNodeB) and a serving gateway in accordance with a conventional operation.

S22: However, one or more of the mobile communications device the base station, the serving gateway or the PDN-GW maybe provided with an indication of the type of data packets which are to be communicated via the communications bearer between the mobile communications device and the PDN-GW established in step S20. The indicated type of data packets to be communicated in the communications bearer may include an indication that the data packets are of a low priority source and/or that the data packets are generated from an MTC application.

S24: The communications network may generate an indication that the network is congested and provide a signal to the mobile communications device, the base station, the serving gateway or the PDN-GW that the network is congested. Alternatively, these elements may receive an indication from an IP layer via an ECN indication that the communications network is congested.

S26: The mobile communications device, the base station, the S-GW or the PDN-GW may then control the communication of the data packets via the communications bearer to the effect of differentiating the communication in accordance with the type of communications data packets. For example, if the data packets are from a low priority source or an MTC application then for example the base station, the mobile communications device, the S-GW or the PDN-GW may buffer the data packets but may not buffer data packets from other communications various with a higher priority. Thus the data packets of the lower priority are buffered in preference to those of the higher priority data packets. The data packets with the lower priority may also be discarded after a pre-determined time or after congestion has reached a pre-determined level.

S28: Optionally one or more of the mobile communications device, the base station, the serving gateway or the PDN-GW may store the data packets in a buffer for low priority and/or MTC data packets and then only forward the data packets to the next element of the mobile communications network if there is a positive indication that there is no congestion present. For example, the eNodeB may store the data packets for a low priority/MTC communications bearer received from the mobile communications device and only forward the data packets to an S-GW if the S-GW provides a positive indication that it is not congested.

Control of Communications Network Using Context Information Stored in the Core Network Entities As explained above, the mobile communications network may store an MTC indicator or a low priority indicator in the core network entities, for example in the MME, S-GW and/or PDN-GW. These indicators could be used to count the following:

The number of bearers established for the MTC use and/or;

The number of devices which have some bearers configured for MTC and/or;

The number of devices which have bearers established which are exclusively used for MTC (the device is purely used for an MTC application the so called an MTC device or a UE configured for MTC);

Utilisation for bearers of particular types.

Figure 13:
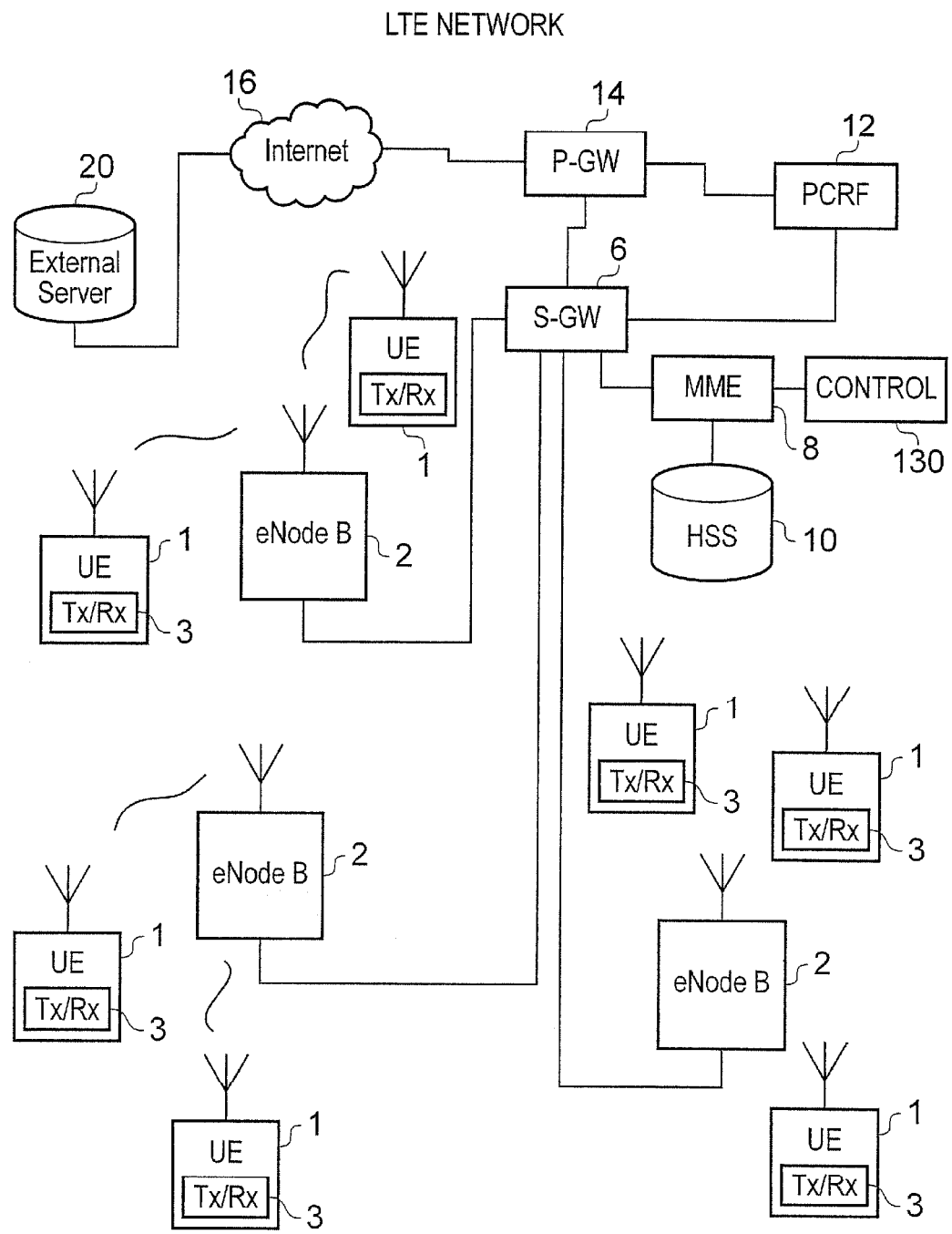
FIG. 13 is a schematic block diagram of the mobile communications network and mobile communications devices forming a communication system shown in FIG. 1 adapted to include a control unit operating in accordance with the present technique.
Figure 14:
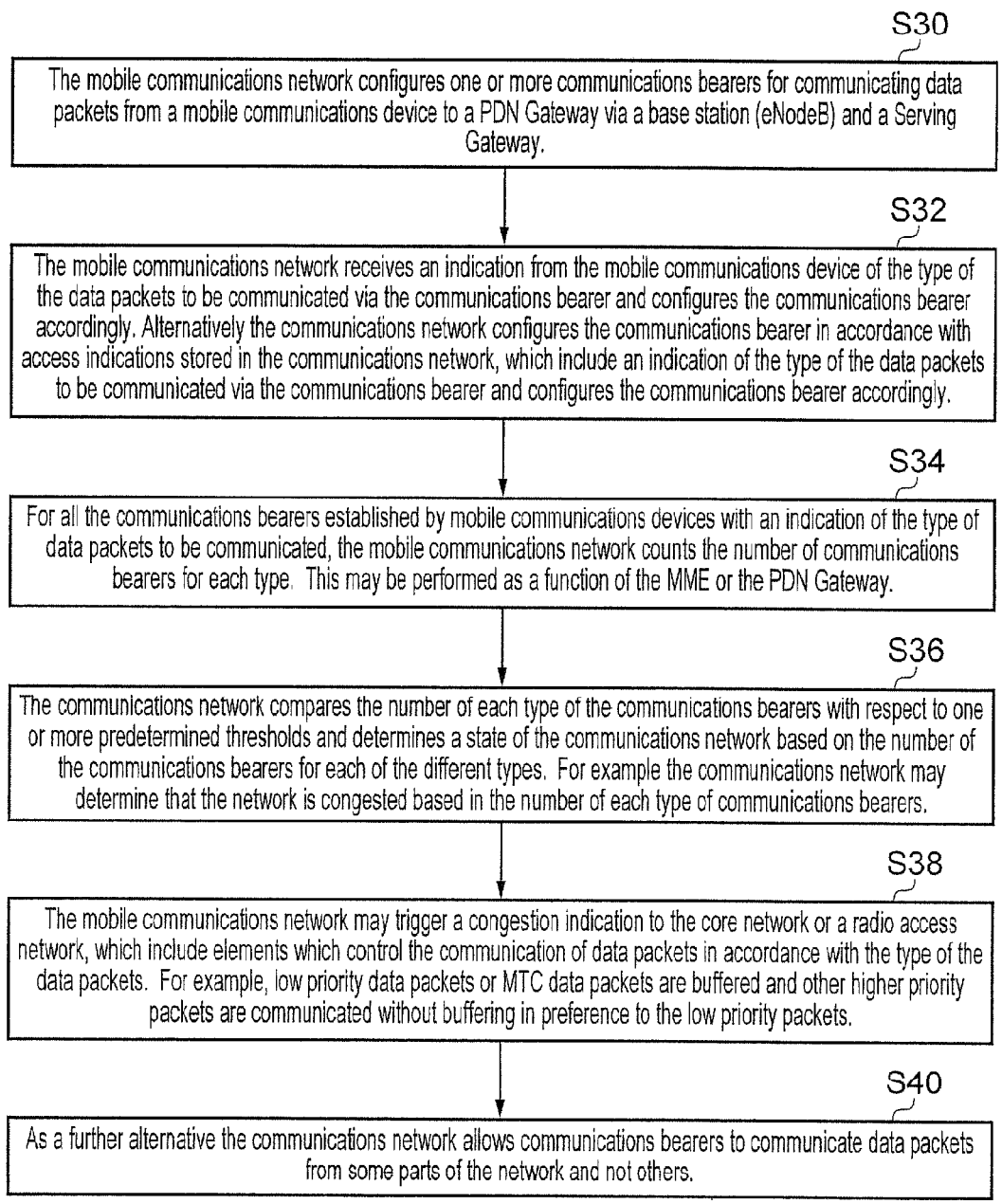
FIG. 14 is a flow diagram illustrating a process in which a mobile communications network is controlled in accordance with a relative loading of the network determined in accordance with the present technique.

In accordance with the further aspect of the present technique the mobile communications network of FIG. 1 is shown in FIG. 13 and may include a control unit 130 which is attached to the mobile communications network. In one example of the control unit 130 may be attached to the MME 8 or may form part of the PDN-GW 14 or the S-GW 6.

In operation the control unit 130 counts the number of bearers of each of the type of communications bearers which are established by the mobile communications devices within the network. Thus, if a mobile communications device indicates a type of data packets to be communicated via the communications bearer then this type of data packets being one of a pre-determined set of types is monitored by the control unit 130 and counted to produce an overall count of the number of communications bearers communicating each type of data packets. Accordingly, the control unit 130 may generate an indication of the state of the communications network and determine for example whether the communications network is congested and which parts of that network are congested. Thus, the control unit can then trigger certain actions of the mobile communications network in accordance with the level of congestion.

According to the present technique, at any point in time, the control unit 130 counts the number of bearers of each of the type of communications bearers which are established by the mobile communications devices within the network or measure utilization for bearers of each type. After having performed a count/measurement of a given status of the network at a certain point in time, the control unit 130 may compare these with threshold values. These threshold values can be statically defined per node or be varied with the system utilization by devices and bearers. Once the threshold values are determined the actual measured values are compared with threshold values and when a triggering condition is met the following three examples may be used to control the network:

1: The device which performs the measurement: S-GW. The actions are the following:
- The S-GW may inform the MME/PDN-GW that the load generated by the bearers used for MTC traffic or by MTC devices configured for MTC is above/below the threshold value;
- The S-GW may start throttling data for some categories of users;
  - UEs configured for MTC which are of low priority;
  - UE which also run MTC applications which might be of low priority or not;
  - UE which do not run MTC applications;
  - UE configured for MTC which are not of low priority;
  - Any of the above categories for mobile communication devices in the IDLE state or in the Connected state
- The throttling is performed as long as the measured figure is above the threshold value;
- The PDN-GW may also start/stop throttling in the same way as the S-GW based on the indication received from the S-GW (or the throttling could only be done at the PDN-GW). If the S-GW was requested to throttle X % of new DL packets for mobile communication devices in IDLE mode, then this the X figure could be scalled at the PDN-GW in the following way: X1% (at the PDN-GW)=X %*(number of all users using this P-GW/number of users in idle mode and using this P-GW) The indicator may also include % of data to be throttled for each bearer type;
- The MME based on the indication received from the S-GW may trigger the S-GW to be relocated for some groups of devices or impact the Serving gateway selection process.

2: The device which performs the measurement: PDN-GW. The actions are the following:
- Likewise the PDN-GW may indicated to the MME that some trigger conditions are met which will trigger the MME to relocate the PDN-GW;
- The MME can also trigger the APN based congestion control mechanisms, based on an indication received from the PDN-GW;
- The MME based on indication (bearer type counts and/or utilization per bearer type) may alter the PDN-GW selection function to take these data into account.

3: The device which performs the measurement: MME. The actions are the following:
- The Serving MME for the selected group of devices might be relocated to another MME available e.g. in the pool of MMEs serving the MME area;
- Some groups of devices might be forced to detach from the system, or detach for a limited time without permission to attach to another network;
- Some groups of users when trying to attach or access the system will be told to either stay in the dormant/de-registered plus state when they will not be allowed to re-attach to the same PLMN for X minutes/hours. However they will not try to attach to other networks during this waiting time, or some groups of devices will not be allowed to access the system. This can be signalled in the AS messages at the time of access attempt or may be signalled for all other devices as well e.g. on the broadcast channel effectively preventing them to initiate the access procedure;
- The MME may also force some groups of users to be handed over to another cell/eNodeB or even to initiate the inter-RAT or inter-System handovers.

The operation of the control unit 130 is summarised in FIG. 13 and presented as follows:

S30: The mobile communications network configures one or more communications bearers for communicating data packets from a mobile communications device to a PDN-GW via a base station and a S-GW.

S32: The mobile communications network receives an indication from the mobile communications device of the type of data packets to be communicated via the communications bearer and configures the communications bearer accordingly. Alternatively, the communications network configures the communications bearer in accordance with access indications stored in the communications network which include an indication of the type of the data packets to be communicated via the communications bearer and configures the communications bearer accordingly.

S34: For all of the communications bearers established by the communications devices with an indication of the type of the data packets to be communicated, the mobile communications network counts the number of communications bearers of each type this may be performed as a function of the MME or the PDN-GW for example or measure utilization per bearer type e.g. at the serving gateway or PDN gateway.

S36: The communications network compares the number of each type of the communications bearers for each of a plurality of pre-determined types with respect to one or more pre-determined thresholds. The communications network can then determine a state of the communications network based on the number and/or utilization of communications bearers for each of the different types. For example, the communications network determine that the network is congested based on a number and/or utilization of each type of the communications bearers and node capacity.

S38: The communications network may trigger a congestion indication to the core network or the radio network parts which include elements which control the communication of data packets in accordance with the type of the data packets. For example, low priority data packets or MTC data packets may be buffered and other high priority packets are communicated without buffering in preference to the low priority packets. In addition, the low priority packets may be discarded in favour of retaining the high priority packets.

S40: As an alternative the communications network may allow communications bearers to communicate data packets from some parts of the network and not others. Thus, MTC type communications may be allowed in one part of the network via base stations and a serving gateway but not communications via another serving gateway. Furthermore, the count of the number of each of the different types of data packets communicated by each of the communications bearer can be determined for each of the nodes of the mobile communications network therefore providing a relative distribution of the MTC communications devices in the mobile communications network.

Distribution of Type of Packet Indicator

Figure 12:
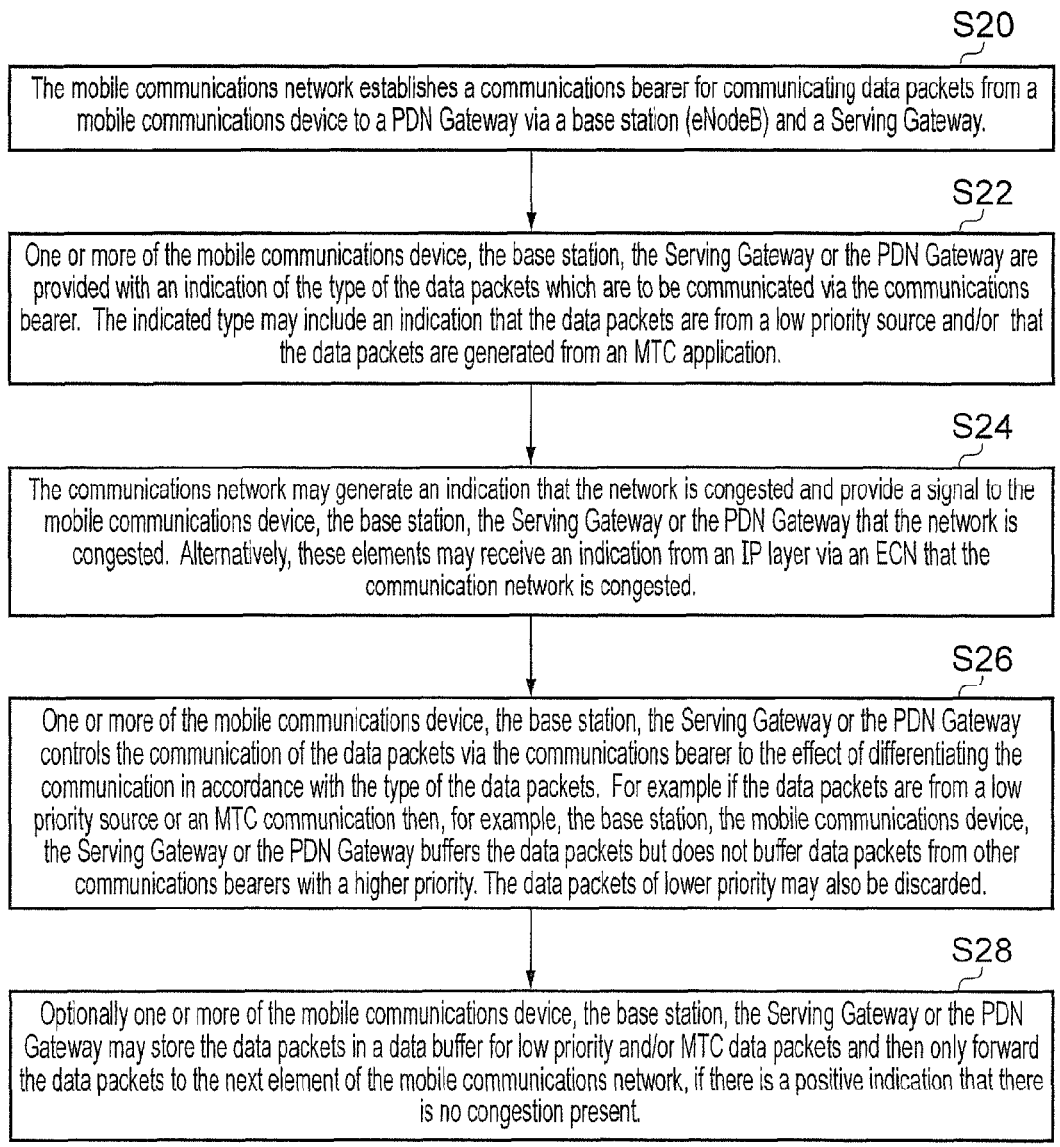
FIG. 12 is a flow diagram illustrating a process in which a mobile communications network controls the communication of data packets in accordance with a relative priority of the data packets from a communications bearer with respect to the data packets of another communications bearer.
Figure 15:
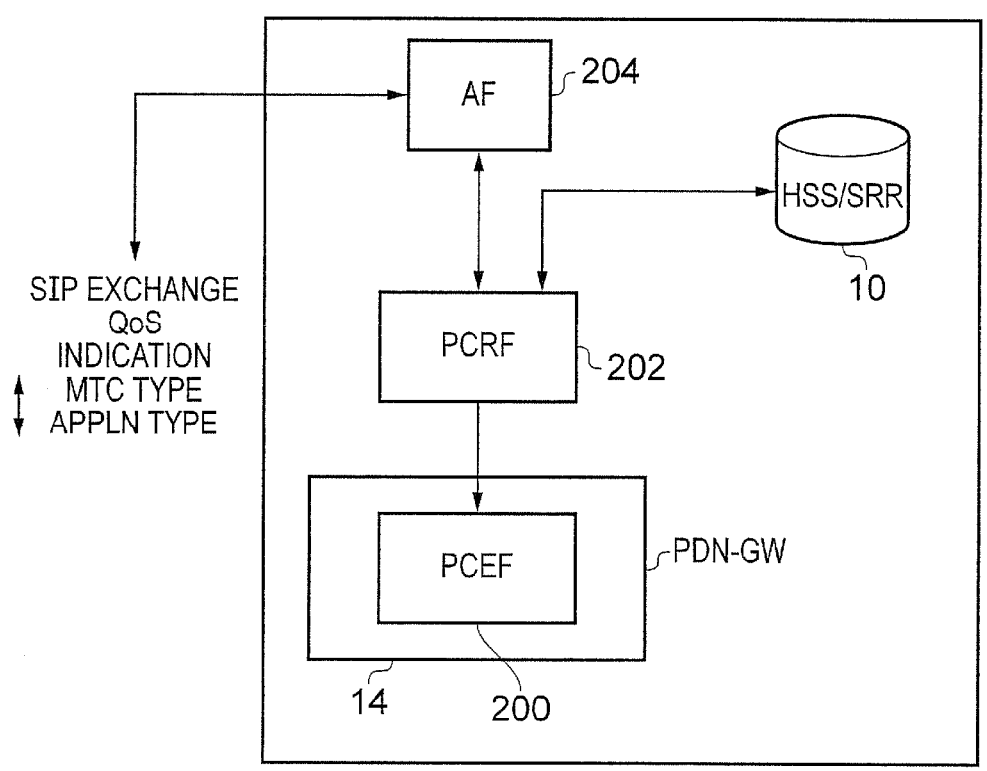
FIG. 15 is a schematic block diagram illustrating components of an LTE network which are arranged to distribute an indication that a communications bearer is for low priority or an MTC type application to network elements.

FIG. 15 provides a schematic block diagram of a part of the mobile communications network shown in FIGS. 1 and 12 which include elements which are arranged to establish communications bearers and may include context information for those bearers. As shown in FIG. 15 a policy control enforcement function PCEF 200 may form part of the PDN-GW 14 which is connected to a policy charging and rules function (PCRF) 202. The policy charging and resource function 202 is connected to a home subscriber server (HSS) 10 and to an application function (AF) 204. In operation the application function 204 is arranged to receive an indication of the MTC type and the application type for a communications bearer using a Session Initiation Protocol (SIP) message exchange which is then propagated via the PCRF 202 to the PCEF 200 in the PDN-GW which can then be used to communicate a type of the communications bearer to other network elements such as the serving gateway or the eNode B.

Various further aspects and features of the present invention are defined in the appended claims. Various modifications may be made to the embodiments described above without departing from the scope of the present invention. For example, embodiment of the present invention finds application with other types of mobile communications networks and is not limited to LTE.

The invention claimed is:

1. A mobile communications network for communicating data to and/or from mobile communications devices, the mobile communications network comprising:
   a core network part including a plurality of infrastructure equipment, and
   a radio network part including a plurality of base stations which are provided with a wireless access interface for communicating data to or from the mobile communications devices,
   wherein the mobile communications network is arranged in operation to receive an indication of a relative access type of data packets to access a communications bearer supporting a communication session of one of the mobile communications devices, the indication of the relative access type of the data packets being received from one of said mobile communication devices and used to configure the communications bearer, and the indication of the relative access type of the data packets including an application type indication and a traffic type indication of a relative priority of the data packets with respect to communication of data packets via one or more other communications bearers of the mobile communications network, and
   wherein the mobile communications network is arranged to provide the communications bearer from the mobile communications device to one or more of the infrastructure equipment via one or more of the base stations in accordance with the indication of the relative access type of the data packets, and to control the communication of the data packets via the communications bearer in accordance with the relative access type of data packets being communicated via the communications bearer.

2. The mobile communications network as claimed in claim 1, wherein the indication of the relative access type of the data packets to access the communications bearer supporting the communication session of one of the mobile communications devices is generated by an applications program, the communication session being provided by the applications program using the communications bearer.

3. The mobile communications network as claimed in claim 1, wherein the mobile communications device includes an execution processor configured to operate a plurality of applications programs, each of which is configured to generate the indication of the relative access type of the data packets for communication to and/or from the communications bearer, or the communications bearer and one or more other communications bearers, and the mobile communications network is arranged in operation to communicate the data packets differently via the communications bearers or the one or more other communications bearers depending on the relative access type of the data packets communicated via each said communications bearer.

4. The mobile communications network as claimed in claim 1, wherein the indication of the relative access type of data packets is received by the mobile communications network with a request to establish, configure, modify the communications bearer.

5. The mobile communications network as claimed in claim 1, wherein the indication of the relative access type of the data packets is received by the mobile communications network as an access stratum message, a non-access stratum message, or a bearer configuration message.

6. The mobile communications network as claimed in claim 1, wherein the indication of the relative access type of the data packets includes an indication that the data packets are for a machine type communication.

7. The mobile communications network as claimed in claim 1, wherein the traffic type indication of the relative priority of the data packets includes one of more of an Allocated Retention Priority value and a Low Priority indicator.

8. The mobile communications network as claimed in claim 1, wherein control of the communication of the data packets via the communications bearer is performed in accordance with the application type indication and the traffic type indication of the relative priority indicated by the relative access type of the data packets and includes storing the data packets in a buffer for communication of the data packets via the communications bearer at a later time in preference to communicating data packets from the one or more other communications bearers at an earlier time with a higher priority.

9. The mobile communications network as claimed in claim 8, wherein the control of the communication f the data packets includes discarding the data packets from the buffer in preference to communicating data packets from the one or more other communications bearers.

10. The mobile communications network as claimed in claim 1, wherein control of the communication of the data packets via the communications bearer is performed in accordance with the application type indication of the relative priority indicated by the relative access type of the data packets in response to a indication of congestion of data packets being communicated by the mobile communications network.

11. The mobile communications network as claimed in claim 1, wherein the relative access type of the data packets includes one or more of a machine type communications indicator, a low priority indicator, a regular user indicator, and a high priority indicator.

12. A mobile communications network for communicating data to mobile communications devices, the mobile communications network including a plurality of base stations which are provided with wireless access interface for communicating data to or from the mobile communications devices,
   wherein the mobile communications network is arranged in operation to receive an indication of a relative access type of data packets to access a communications bearer supporting a communication session of one of the mobile communications devices, the indication of the relative access type of the data packets being received by the mobile communications network from one of said mobile communication devices and used to configure the communications bearer, and the indication of the relative access type of the data packets including an application type indication and a traffic type indication of a relative priority of the data packets with respect to communication of data packets via one or more other communications bearers of the mobile communications network, and wherein the mobile communications network is arranged to provide the communications bearer from the mobile communications device to one or more infrastructure equipment via one or more of the base stations in accordance with the indication of the relative access type of the data packets, and to control the communication of the data packets via the communications bearer in accordance with the relative access type of data packets being communicated via the communications bearer.

13. A method of communicating data to mobile communications devices using a mobile communications network, the mobile communications network comprising a core network part including a plurality of infrastructure equipment, and a radio network part including a plurality of base stations which are provided with a wireless access interface for communicating data to or from the mobile communications devices, the method comprising:

receiving, at the mobile communications network, from one of the mobile communications devices, an indication of a relative access type of data packets to access a communications bearer supporting a communication session, the indication of the relative access type of the data packets being to configure the communications bearer, and the indication of the relative access type of the data packets including an application type indication and a traffic type indication of a relative priority of the data packets with respect to communication of data packets via one or more other communications bearers of the mobile communications network, providing the communications bearer from the mobile communications device to one or more of the infrastructure equipment via one or more of the base stations in accordance with the indication of the relative access type of the data packets, and controlling the communication of the data packets via the communications bearer in accordance with the relative access type of data packets being communicated via the communications bearer.

14. The method as claimed in claim 13, wherein said receiving the indication of the relative access type of the data packets at the mobile communications network includes receiving from an applications program of said one mobile communications device the indication of the relative access type of the data packets for communication via the communications bearer, the communication session being provided by the applications program using the communications bearer.

15. The method as claimed in claim 13,
wherein said receiving the indication of the relative access type of the data packets at the mobile communications network includes receiving from each of a plurality of applications programs operating on said one mobile communications device the indication of the relative access type of the data packets for communication to and/or from the communications bearer, or the communications bearer and the one or more other communications bearers, and wherein said communicating the data packets includes communicating the data packets differently via the communications bearer or the one or more other communications bearers depending on the relative access type of the data packets communicated via each communications bearer.

16. The method as claimed in claim 13, wherein said receiving the indication of the relative access type of data packets at the mobile communications network includes receiving the indication of the relative access type of data packets with a request to establish, configure, or modify the communications bearer.

17. The method as claimed in claim 13, wherein said receiving the indication of the relative access type of data packets at the mobile communications network includes receiving the indication of the relative access type of data packets as an access stratum message, a non-access stratum message, or a bearer configuration message.

18. A method as claimed in claim 13, wherein the indication of the relative access type of the data packets received at the mobile communications network includes an indication that the data packets are for a machine type communication.

19. The method as claimed in claim 13, wherein the traffic type indication of the relative priority includes one of more of an Allocated Retention Priority value and a Low Priority indicator.

20. The method as claimed in claim 13, wherein said controlling the communication of the data packets via the communications bearer in accordance with the relative access type of data packets includes storing the data packets in a buffer for communication of the data packets via the communications bearer at a later time in preference to communicating data packets from the one or more other communications bearers at an earlier time with a higher priority.

21. The method as claimed in claim 20, wherein said controlling the communication of the data packets via the communications bearer in accordance with the relative access type of data packets includes discarding the data packets from the buffer in preference to communicating data packets from the one or more other communications bearers.

22. The method as claimed in claim 13, wherein said controlling the communication of the data packets via the communications bearer in accordance with the relative access type of data packets includes receiving an indication of congestion of data packets being communicated by the mobile communications network.

23. The method as claimed in claim 13, wherein the relative access type of the data packets communicated includes one of more of a machine type communications indicator, a low priority indicator, a regular user indicator, and a high priority indicator.

* * * * *